United States Patent [19]

Hahn et al.

[11] 4,170,663
[45] Oct. 9, 1979

[54] METHOD FOR PRODUCING COATINGS OF LOW GLOSS

[75] Inventors: Ernest A. Hahn, Paris, France; Gary F. Murphy, deceased, late of Naperville, Ill., by Mary Lou Murphy, administratrix; Gerald J. Bruckbauer, Temple, Tex.

[73] Assignee: PPG Industries, Inc., Pittsburgh, Pa.

[21] Appl. No.: 886,306

[22] Filed: Mar. 13, 1978

[51] Int. Cl.$^2$ .................. B05D 3/06; C08G 63/02
[52] U.S. Cl. .................. 427/44; 204/159.19; 204/159.22; 204/159.23; 427/36; 427/38; 428/482; 428/522
[58] Field of Search .................. 204/159.19, 159.22, 204/159.23; 427/44, 54, 36, 38; 428/482, 522

[56] References Cited

U.S. PATENT DOCUMENTS

| | | | |
|---|---|---|---|
| 3,918,393 | 11/1975 | Hahn | 204/159.16 X |
| 3,926,639 | 12/1975 | Rosen et al. | 427/44 X |
| 3,935,330 | 1/1976 | Smith et al. | 427/53 X |
| 4,025,407 | 5/1977 | Chang et al. | 427/44 X |
| 4,048,036 | 9/1977 | Prucnal | 204/159.23 |

Primary Examiner—John D. Smith
Assistant Examiner—Thurman K. Page
Attorney, Agent, or Firm—George D. Morris

[57] ABSTRACT

Hard, mar resistant and abrasion resistant coatings of low gloss are prepared by exposing a coating composition containing an oxygen inhibitable, radiation curable, organic material and an ultraviolet light absorbing pigment to radiation in three stages. In the first stage, the coating composition is exposed to ionizing radiation in an atmosphere containing a cure inhibiting amount of oxygen. In the second stage, it is exposed to ultraviolet light in an atmosphere free of a cure inhibiting amount of oxygen. In the third stage, the coating composition is exposed to ionizing radiation.

26 Claims, 4 Drawing Figures

METHOD FOR PRODUCING COATINGS OF LOW GLOSS

The present invention is a method of producing a hard, mar resistant and abrasion resistant cured, coating of low gloss. This is accomplished by exposing a coating of radiation curable coating composition comprising (1) an oxygen inhibitable, radiation curable organic material having a plurality of sites of ethylenic unsaturation and (2) an ultraviolet light absorbing pigment to ionizing radiation in an atmosphere containing a low gloss imparting amount of oxygen to cure the interior of the coating to a greater degree of cure than a surface layer of the coating, exposing the coating which has been exposed to ionizing radiation to ultraviolet light in an atmosphere wherein any oxygen present is insufficient to significantly inhibit free radical curing of the exterior portion of the surface layer to cure the exterior portion of the surface layer to a greater degree of cure than the interior portion of the surface layer, and exposing the coating which has been exposed to ionizing radiation and ultraviolet light to ionizing radiation to cure the interior portion of the surface layer.

Figure 1:
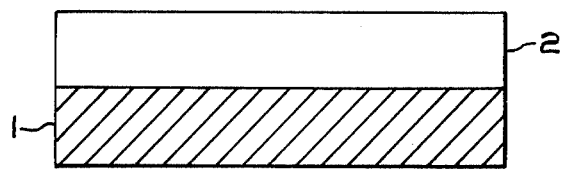
Figure 2:
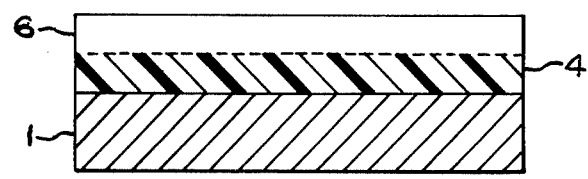
Figure 3:
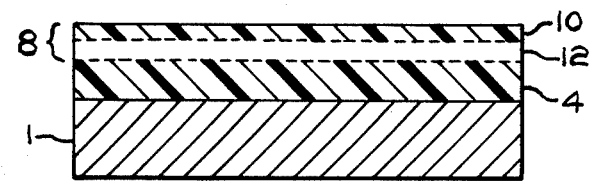
Figure 4:
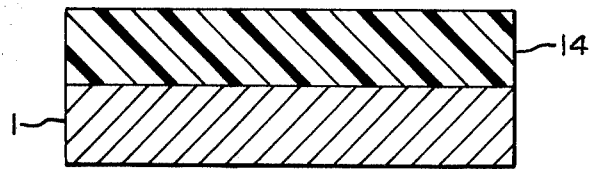

For a better understanding of the invention, reference may be made to the drawings wherein like numerals refer to like parts and in which:

FIG. 1 diagrammatically illustrates in cross section a substrate coated with uncured coating composition;

FIG. 2 diagrammatically illustrates in cross section the coated substrate of FIG. 1 after initial exposure to ionizing radiation;

FIG. 3 digrammatically illustrates in cross section the coated substrate of FIG. 2 after exposure to ultraviolet light; and FIG. 4 diagrammatically illustrates in cross section the coated substrate of FIG. 3 after subsequent exposure to ionizing radiation.

Referring now in more detail to the Figures, the relative or actual thicknesses of the various layers are not drawn to scale, but are shown schematically for purposes of illustration and clearer understanding of the invention.

FIG. 1 shows substrate 1 coated with a coating 2 of radiation curable coating composition. The binder of the radiation curable coating composition contains an oxygen inhibitable, radiation curable, organic material having ethylenic unsaturation. Admixed with the binder is an ultraviolet light absorbing pigment.

The coated substrate is exposed to ionizing radiation in an atmosphere containing a low gloss imparting amount of oxygen. The minimum amount of oxygen that can be used depends upon the susceptibility to oxygen inhibition of the particular radiation curable organic material employed. The amount of oxygen in this curing atmosphere is usually at least about 5000 parts oxygen per million parts of atmosphere by volume. For many radiation curable organic materials, an oxygen concentration of at least 10,000 parts oxygen per million parts atmosphere is generally used. Because air is usually introduced into the system along with the coated substrate as well as by other mechanisms, the maintenance of an oxygen concentration less than that of air in the curing atmosphere generally requires introduction of a compensating flow of gas having an oxygen concentration less than that of the curing atmosphere. It is preferable to maintain the oxygen concentration of the curing atmosphere as close to that of air as possible in order that the flow of such gas may be minimized. Typically, the oxygen concentration of the curing atmosphere is in the range of from about $10 \times 10^4$ to about $2.2 \times 10^5$ parts oxygen per million parts atmosphere by volume. More often, the oxygen concentration is in the range of from about $1.5 \times 10^4$ to about $2.1 \times 10^5$ parts oxygen per million parts atmosphere by volume. Preferably, the curing atmosphere is ordinary air which typically contains about $2.1 \times 10^5$ parts oxygen per million parts atmosphere, by volume. Greater proportions of oxygen may be used although ordinarily, there is little advantage to do so. During the exposure to ionizing radiation, the interior of the coating is cured to a greater degree of cure than the surface layer of the coating. For brevity, this first exposure to ionizing radiation is termed the first stage.

FIG. 2 shows the coated substrate after exposure in the first stage. Adjacent substrate 1 is the cured interior 4 of the coating composition overlain by surface layer 6 which has been cured to a lesser degree than interior 4.

The exposed coated substrate from the first stage is then exposed to ultraviolet light in an atmosphere wherein any oxygen present is insufficient to significantly inhibit free radical curing of the exterior portion of the surface layer, to cure the exterior portion of the surface layer to a greater degree of cure than the interior portion of the surface layer. The maximum concentration of oxygen that can be used in this curing atmosphere depends upon the particular coating composition employed. However, this atmosphere always contains a lower concentration of oxygen than that of the first stage. Usually, this curing atmosphere contains less than about 1000 parts oxygen per million parts of atmosphere, by volume. For some coating compositions, somewhat more than 1000 parts oxygen per million parts of atmosphere may be used. Typically, the oxygen concentration of the curing atmosphere during exposure to ultraviolet light is in the range of from about 300 to about 5000 parts oxygen per million parts atmosphere, by volume. Preferably, the oxygen concentration is in the range of from about 500 to about 1500 parts oxygen per million parts atmosphere, by volume. During the exposure to ultraviolet light, the exterior portion of the surface layer is cured to a greater degree than the interior portion of the surface layer. Usually, the exterior portion is substantially fully cured during this exposure to ultraviolet light. For brevity, this exposure to ultraviolet light is termed the second stage.

FIG. 3 shows the coated substrate after exposure in the second stage. Adjacent substrate 1 is the cured interior 4 of the coating composition overlain by surface layer 8. Surface layer 8 comprises interior portion 12 and exterior portion 10 which has been cured to a greater degree than interior portion 12.

The exposed coated substrate from the second stage is then exposed to ionizing radiation to cure the interior portion of the surface layer and produce a hard, mar resistant and abrasion resistant, cured, coating of low gloss.

If the exterior portion of the surface layer has been substantially fully cured in the second stage, the oxygen concentration of the curing atmosphere during this subsequent exposure to ionizing radiation is generally of little importance inasmuch as the cured exterior portion serves to prevent significant oxygen inhibition of the curing of the interior portion. The illustrative values and ranges of oxygen concentration discussed with respect to either the first stage or the second stage are generally applicable to the curing atmosphere during this subsequent exposure to ionizing radiation when the exterior portion of the surface layer has been substantially fully cured in the second stage. As a matter of convenience, an atmosphere of air is generally employed although atmospheres having greater or lesser concentrations of oxygen than air are satisfactory.

If substantially full cure of the exterior portion of the surface layer has not been developed in the second stage, any oxygen present in the curing atmosphere during this subsequent exposure to ionizing radiation should be insufficient to significantly inhibit free radical curing of the exterior portion. The principles and illustrative values and ranges of oxygen concentration are substantially the same as those discussed with respect to the second stage.

For brevity, this subsequent exposure to ionizing radiation is termed the third stage.

FIG. 4 shows the cured coated substrate after exposure in the third stage. Adjacent substrate 1 is hard, mar resistant and abrasion resistant, cured coating 14 having low gloss.

Although it is not desired to be bound by any theory, it is believed that in the first stage, the polymerization of the surface layer is inhibited by the oxygen present in the curing atmosphere and remains wet or tacky. Since significant amounts of oxygen cannot reach the interior of the coating, polymerization of the interior is not inhibited by oxygen and the interior is cured through free radical polymerization to a reasonably hard polymer. While the degree of cure of the surface layer and the interior differ considerably, there is probably not a discontinuity at the interface as such, but rather a region where the degree of polymerization changes rapidly as position within the coating is varied depthwise. During this first stage cure, several things appear to occur when pigment is present in the coating composition. First, the interior of the coating shrinks in going from low molecular weight to high molecular weight and during this shrinkage, it is believed that a small amount of pigment is forced into the wet surface layer thereby increasing the pigment to binder ratio in the surface layer. Second, the surface layer, which remains wet to the touch, has been somewhat polymerized and is now approximately the consistency of soft butter. Although it is soft and can be easily wiped off with the finger or a cloth, it does have sufficient rheological properties to support pigment. Third, there appears to be a micro-evaporation of resin at the surface of the coating which causes pigment to be exposed. Even though exposed, the pigment probably remains coated with a very thin layer of the organic material. Ordinarily, when inert volatile solvents are absent from the coating composition, the amount of loss is less than 0.5 percent by weight. The net effect of these occurrences appears to be that the pigment to binder ratio in the thin surface layer is significantly increased thereby reducing the gloss.

During exposure of a film of homogeneous radiation curable coating composition to ultraviolet light, it is believed that the ultraviolet light intensity diminishes in a fashion which is generally exponential with depth. If the intensity at the surface $I_o$, is low, it can happen that the intensity I at some depth $x_t$ is at the threshold value for the coating composition. When this occurs, the coating is sufficiently crosslinked from the surface to the depth $x_t$ whereas little crosslinking occurs at greater depths. The presence of ultraviolet light absorbing material in the coating composition ensures that the intensity I in the interior portion of the surface layer is below the threshold value during second stage exposure and hence the interior portion does not significantly cure. Since the intensity in the exterior portion is above the threshold value, the exterior portion cures during the second stage.

It is believed that as the exterior portion of the surface layer cures during the second stage, it shrinks. Since the exterior portion is underlain by a relatively uncured interior portion, the exterior portion is not held rigidly and forms micro-wrinkles as it shrinks. This micro-wrinkling is thought to be contributive to the very low values of gloss obtainable by this invention.

If an ultraviolet light absorbing pigment were not present in the coating composition, the entire surface layer would be cured in the second stage. Low values of gloss can be obtained by such a method as shown in U.S. Pat. No. 3,918,393. If the coating is loaded with pigment which does not significantly absorb ultraviolet light in an attempt to further reduce the gloss, however, there is a point where the pigment to binder ratio exceeds a value at which the pigment is not held firmly by the binder and the resistance to burnishing is low. In the present invention, it is believed that the interior portion of the surface layer maintains the exterior portion relatively resin-rich during second stage curing. Accordingly, pigmented products produced according to this invention may have both very low gloss and substantial resistance to burnishing.

Substantially any oxygen inhibitable, radiation curable, organic material may be used in the practice of the invention. In general, these organic molecules contain a plurality of sites of ethylenic unsaturation which, under the influence of radiation of the ionizing or ultraviolet type become crosslinking sites through addition reactions to form hard thermoset polymers. The sites of ethylenic unsaturation may lie along the backbone of the molecule or they may be present in side chains attached to the molecular backbone. As a further alternative, both of these arrangements may be present concurrently. The oxygen inhibitable, radiation curable, organic materials having a plurality of sites of ethylenic unsaturation include the oxygen inhibitable, radiation curable, organic polymers having a plurality of sites of ethylenic unsaturation and the oxygen inhibitable, radiation curable, organic monomers having a plurality of sites of ethylenic unsaturation and a molecular weight of at least 170. Mixtures of such polymers and monomers may be used as the organic material.

The ethylenically unsaturated polyesters constitute a particularly preferred class of oxygen inhibitable, radiation curable, organic polymer. These polyesters are ordinarily esterification products of ethylenically unsaturated polycarboxylic acids and polyhydric alcohols. Usually, the ethylenic unsaturation is in the alpha, beta position with respect to the carbonyl group.

The ethylenically unsaturated polycarboxylic acids include maleic acid, fumaric acid, aconitic acid, itaconic acid, citraconic acid, mesaconic acid, muconic acid and dihydromuconic acid and halo and alkyl derivatives of such acids. The preferred acids are maleic acid and fumaric acid. Especially preferred is maleic acid. Mixtures of ethylenically unsaturated polycarboxylic acids may be used or only a single such acid may be employed. The anhydrides of these acids, where the anhydrides exist, are, of course, embraced by the term "acid", since the polyesters obtained therefrom are essentially the same whether the acid or anhydride is used in the reaction.

One or more saturated polycarboxylic acids may optionally be utilized in combination with the ethylenically unsaturated acid or anhydride in the preparation of unsaturated polyesters. Such acids, especially the saturated dicarboxylic acids, increase the length of the polyester without adding additional crosslinking sites, which is a desired feature in some polyesters. Saturated tricarboxylic acids and saturated acids of higher carboxylic functionality may be used to provide branching where this is desirable.

For purposes of the present invention, the aromatic nuclei of aromatic acids such as phthalic acid are generally regarded as saturated since the double bonds do not ordinarily react by addition as do ethylenic groups. Therefore, wherever the term "saturated" is utilized, it is to be understood that such term includes aromatic unsaturation or other forms of unsaturation which do not react by addition, unless otherwise qualified.

Examples of useful saturated polycarboxylic acids include oxalic acid, malonic acid, succinic acid, methylsuccinic acid, 2,2-dimethylsuccinic acid, 2,3-dimethylsuccinic acid, hexylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebaccic acid, phthalic acid, isophthalic acid, terephthalic acid, tetrachlorophthalic acid, tetrahydrophthalic acids, 1,2-hexahydrophthalic acid, 1,3-hexahydrophthalic acid, 1,4-hexahydropththalic acid, 1,1-cyclobutanedicarboxylic acid and trans-1,4-cyclohexanedicarboxylic acid. As in the case of the ethylenically unsaturated polycarboxylic acids, the anhydrides of the saturated acids, where anhydrides exist, are embraced by the term "acid" since the polyesters obtained therefrom are essentially the same.

The ethylenically unsaturated polycarboxylic acids are usually present in an amount in the range of from about 10 mole percent to about 100 mole percent of the polycarboxylic acids employed. Preferably, they are present in the range of from about 50 mole percent to about 100 mole percent.

The polyhydric alcohols useful in preparing ethylenically unsaturated polyesters include saturated polyhydric alcohols such as ethylene glycol, 1,3-propanediol, propylene glycol, 2,3-butane diol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, dipropylene glycol, neopentyl glycol, glycerol, pentaerythritol, erythritol, sorbitol, mannitol, 1,1,1-trimethylpropane, trimethylolethane, and 2,2-dimethyl-3-hydroxypropyl 2,2-dimethyl-3-hydroxypropionate. Ethylenically unsaturated polyhydric alcohols such as 2-butene-1, 4-diol may be used alone or in admixture with the saturated polyhydric alcohols. Of course, mixtures of saturated polyhydric alcohols or mixtures of unsaturated polyhydric alcohols may be employed. If unsaturated polyhydric alcohols are used to introduce ethylenic unsaturation into the polyester, the preparation of ethylenically unsaturated polycarboxylic acid may be reduced correspondingly, if desired.

Polymers having ethylenic unsaturation in sidechains attached to the molecular backbone are usually prepared by including one or more monomers which, when interpolymerized with other monomers, to form the polymer, provides reactive sites attached to the polymer along the backbone. Ethylenically unsaturated compounds having at least one functional group which will react with the reactive sites on the polymeric backbone are then used to introduce the ethylenic unsaturation into the molecule. The usual reactive sites attached directly or indirectly to the polymer are hydroxy, amino, carboxy, carbamyl or epoxy. Hydroxy or carboxy are most often used. When the reactive sites are hydroxy, the ethylenically unsaturated compound usually has carboxy, haloformyl (most often chloroformyl) or isocyanato functionality. When the reactive sites on the polymer are amino, the ethylenically unsaturated compound usually has isocyanato, haloformyl (again, most often chloroformyl) or epoxy functionality. When the reactive sites on the polymer are carboxy, the ethylenically unsaturated compound generally has hydroxy, epoxy or isocyanato functionality. When the reactive sites are carbamyl, they are usually reacted with formaldehyde to produce N-methylol carbamyl groups. The ethylenically unsaturated compound ordinarily contains carboxy, haloformyl or isocyanato functionality. When the reactive sites are epoxy (usually glycidyl), the ethylenically unsaturated compound generally has carboxy functionality.

The polymer having reactive sites attached thereto can itself be any of many types, as for example, polyacrylates, polyamides, polyesters, polyethers or polyurethanes.

The term polyacrylate is used in its broadest sense to include not only polymerized unsubstituted acrylates, but also polymerized α-substituted acrylates, such as methacrylates, ethacrylates and α-chloroacrylates. Compounds from any of these subclasses may be used alone, but most often, compounds from two or more subclasses are interpolymerized.

Examples of suitable monomers which may be used in the preparation of the polyacrylate polymer include methyl acrylate, ethyl acrylate, propyl acrylate, isopropyl acrylate, butyl acrylate, isobutyl acrylate, sec-butyl acrylate, tert-butyl acrylate, amyl acrylate, hexyl acrylate, heptyl acrylate, octyl acrylate, 2-ethylhexyl acrylate, decyl acrylate, dodecyl acrylate, methyl methacrylate, ethyl methacrylate, propyl methacrylate, isopropyl methacrylate, butyl methacrylate, isobutyl methacrylate, sec-butyl methacrylate, tert-butyl methacrylate, amyl methacrylate, hexyl methacrylate, heptyl methacrylate, octyl methacrylate, 2-ethylhexyl methacrylate, decyl methacrylate, dodecyl methacrylate methyl α-chloroacrylate, ethyl α-chloroacrylate, propyl α-chloroacrylate, hexyl α-chloroacrylate, octyl α-chloroacrylate, decyl α-chloroacrylate and dodecyl α-chloroacrylate. Esters of unsubstituted acrylic acid and methacrylic acid are most often used.

Acrylic monomers which introduce reactive sites to the polymer molecule are acrylic acid, 2-hydroxyethyl acrylate, 2-hydroxypropyl acrylate, 3-hydroxypropyl acrylate, glycidyl acrylate, acrylamide, 2-aminoethyl acrylate, methacrylic acid, 2-hydroxyethyl methacrylate, 2-hydroxypropyl methacrylate, 3-hydroxypropyl methacrylate, glycidyl methacrylate, methacrylamide, 2-aminoethyl methacrylate, 3-aminopropyl methacrylate and α-chloroacrylic acid.

Other ethylenically unsaturated monomers are often included. Examples of these compounds are styrene and α-methylstyrene.

The amount of acrylic monomers which are used to introduce reactive sites to the polymer molecule may vary widely, but they are ordinarily present in the range of from about 3 percent to about 50 percent by weight of the ethylenically unsaturated monomers interpolymerized. An amount in the range of from about 4 percent to about 25 percent is most often the case.

Addition polymerization may be effectuated by combining the ethylenically unsaturated monomers with a free radical initiator and heating the mixture. Exemplary free radical initiators are organic peroxides such as ethyl peroxide and benzyl peroxide; hydroperoxides such as methyl hydroperoxide, acyloins such as benzoin; certain azo compounds such as α,α'-azobisisobutyronitrile and γ,γ'-azobis(γ-cyanovaleric acid); persulfates; peracetates such as methyl peracetate and tert-butyl peracetate; peroxalates such as dimethyl peroxalate and di(tert-butyl) peroxalate; disulfides such as dimethyl thiuram disulfide and ketone peroxides such as methyl ethyl ketone peroxide. The polymerization may be accomplished in the presence or absence of an inert solvent. Temperatures in the range of from about 23° C. to about 205° C. are generally employed. More often, temperatures in the range of from about 37° C. to about 150° C. are used.

When the polymer is a polyamide, polyester, polyether or polyurethane, the principles are analogous to those given for the polyacrylates. The known reactions for forming such polymers will, of course, be used instead of the addition polymerization reaction illustrated above for the polyacrylates.

The number average molecular weight of the oxygen inhibitable, radiation curable organic polymers having a plurality of sites of ethylenic unsaturation is usually in the range of from about 1500 to about 50,000. Most often, the number average molecular weight is in the range of from about 1500 to about 3000.

Oxygen inhibitable, radiation curable, organic monomers having a plurality of sites of ethylenic unsaturation which may be used in the invention, generally comprise divalent, trivalent, tetravalent or moderately higher polyvalent organic radicals whose bonds are satisfied with unsubstituted acrylyloxy, α-substituted acrylyloxy or other ethylenically unsaturated groups. The polyvalent radical may be aliphatic, cycloaliphatic or aromatic. Usually, the molecular weight of the monomer is in the range of from about 170 to about 1500. Examples of such monomers are the diacrylates and dimethacrylates of ethylene glycol, 1,3-propanediol, propylene glycol, 2,3-butanediol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, propylene glycol, 5,5-dimethyl-3,7-dioxanonane-1,9-diol and 2,2-dimethyl-3-hydroxypropyl 2,-2-dimethyl-3-hydroxypropionate; the triacrylates, trimethacrylates, diacrylates and dimethacrylates of glycerol, 1,1,1-trimethylolpropane and trimethylolethane; and the tetracrylates, tetramethacrylates, triacrylates, trimethacrylates, diacrylates and dimethacrylates of pentaerythritol and erythritol. Examples of monomers of higher acrylic functionality are the epoxidized drying oil acrylates and the epoxidized semi-drying oil acrylates described in U.S. Pat. No. 3,713,864 and their methacrylic analogues. Other examples are the melamine-based acrylates and methacrylates disclosed in British Patent Specification No. 628,150 and U.S. Pat. Nos. 3,047,532; 3,056,760 and 3,899,611. The acrylic groups on the monomer molecules are usually the same, but they may be different as exemplified by the compound 2,2-dimethyl-1-acrylyloxy-3-methacrylyloxypropane.

Examples of satisfactory organic monomers are acrylic functional polyester and acrylic functional polyamide molecules represented by the formulae:

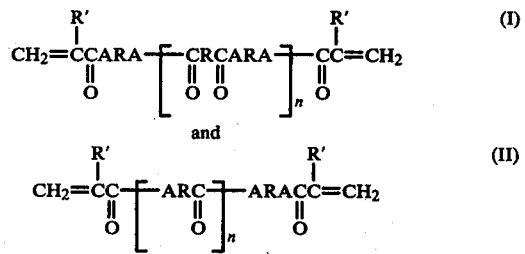

wherein n is an integer in the range of from 1 to 4;

each R independently represents a divalent aliphatic, cycloaliphatic or aromatic hydrocarbon radical having from 1 to 10 carbon atoms;

each R' independently represents hydrogen, methyl or ethyl; and each A independently represents O or NH.

It is preferred that every A represent O. The polyester and polyamide monomers represented by formula (I) may be prepared by reacting dicarboxylic acids or acid amides and dihydric alcohols ordiamines and then reacting the product with an unsubstituted acrylic acid or an α-substituted acrylic acid. The acrylic polyester and polyamide monomers represented by formula (II) may be prepared by reacting a hydroxyfunctional monocarboxylic acid, a dimer, trimer or a tetramer of such acid, an amino functional monocarboxylic acid or a dimer, trimer or tetramer of such acid with an unsubstituted or α-substituted acrylic acid. Where desired, the lactone may be used in lieu of the hydroxy functional monocarboxylic acid and the lactam may be used in place of the amino functional monocarboxylic acid.

Other examples of satisfactory radiation curable acrylic monomers are the urethane containing acrylic monomers described in U.S. Pat. Nos. 3,509,234 and 3,700,643 and the ether containing polymers described in British Patent Specification No. 1,006,587 and U.S. Pat. No. 3,772,062. The diacrylate of Epon 828 bisphenol A-diglycidyl ether (Shell Chemical Company) is particularly useful. Urea containing acrylic monomers may also be used. These may be prepared by reacting two equivalents of a diisocyanate with one equivalent of a polyol to form an intermediate, then reacting a portion of the unreacted isocyanato groups with water to form urea groups followed by reacting the remaining isocyanate groups with an hydroxyalkyl acrylate or methacrylate. The polyol may be any of the polyols used to prepare polyester resins, or they may be of higher molecular weight such as polycaprolactone polyols or hydroxyl terminated polyesters, polyamines and polyurethanes. Examples of suitable diisocyanates are 2,4-diisocyanatotoluene, 2,6-diisocyanatotoluene, 1- isocyanatomethyl-5-isocyanato-1,3,3-trimethylcyclohexane, bis(4-isocyanatocyclohexyl)methane, bis(4-isocyanatophenyl)methane and 1,6-diisocyanatohexane.

The amount of oxygen inhibitable, radiation curable, organic material present in the polymerizable coating composition is subject to wide variation. The material is ordinarily present in an amount in the range of from about 20 to 100 percent by weight of the binder of the coating composition. An amount in the range of from about 50 to 100 percent is typical. From about 80 to 100 percent by weight of the binder is preferred.

Ultraviolet light absorbing pigment used in the coating composition includes, but is not limited to, titanium dioxide (including rutile and anatase), antimony trioxide, zinc oxide, zirconium oxide, zinc sulfide, lithopone, ground soda glass and mixtures thereof. The preferred pigment is titanium dioxide. Rutile is especially preferred. Only one ultraviolet light absorbing pigment or mixtures of such pigments may be used.

The amount of ultraviolet light absorbing pigment used may vary widely. The minimum amount depends primarily upon how strongly the ultraviolet light absorbing pigment absorbs ultraviolet light. The amount should be sufficient so that the exterior and interior portions of the surface layer are not cured to the same degree of cure during the second stage exposure to ultraviolet light. The amount should not be so great, however, that the cured coating is rendered unsuitable for use. Usually, the amount of ultraviolet light absorbing pigment should constitute at least about 5 percent by weight of the radiation curable coating composition. Amounts in the range of from about 5 percent to about 70 percent by weight of the radiation curable coating composition are ordinarily employed. From about 10 percent to about 50 percent is typical.

Vinyl monomers which crosslink with the oxygen inhibitable radiation curable, organic material to form thermosetting materials may be present in the coating composition. Vinyl monomers are especially used with the unsaturated polyesters. The molecular weight of these vinyl monomers is usually below 170. Examples of vinyl monomers which may be used are styrene, α-methylstyrene, divinylbenzene, methyl acrylate, methyl methacrylate, ethyl acrylate, ethyl methacrylate, propyl acrylate, propyl methacrylate, butyl acrylate, butyl methacrylate and hexyl acrylate. The preferred vinyl monomers are liquid compounds miscible with the first component. These vinyl monomers are preferably free of nonaromatic carbon-carbon conjugated double bonds. The use of one or more vinyl monomers is desirable because the greater mobility of the smaller vinyl monomer molecule, as compared to the much larger first component, allows crosslinking to proceed faster than if the vinyl monomer were absent. Another benefit is that the vinyl monomer usually acts as a reactive solvent for the first component thereby providing coating compositions having a satisfactorily low viscosity without using an inordinant amount, if any at all, of volatile, non-reactive solvent.

The vinyl monomer, or mixtures of vinyl monomers, may be employed over a broad range. At the lower end of the range, no vinyl monomer need be used. The upper and of the range is a moderate excess of vinyl monomer over the amount required to crosslink the ethylenic unsaturation of the oxygen inhibitable, radiation curable, organic material. The amount of monomer should be sufficient to provide a liquid, flowable interpolymerizable mixture. Ordinarily, the monomer will be present in the coating composition in the range of from about 0 to about 45 percent by weight of the binder of the coating composition. When used, the vinyl monomer will ordinarily be in the range of from about 15 to about 30 percent by weight of the binder.

Extender pigments which are generally transparent to ultraviolet light are optional ingredients which are often included in the coating composition. Examples of suitable extender pigments are finely divided particles of silica, barytes, calcium carbonate, talc, magnesium silicate, aluminum silicate, etc. When used, extender pigment is generally present in an amount in the range of from about 1 to about 70 percent by weight of the coating composition. An amount in the range of from about 1 to about 50 percent is more often employed. Most often, it is present in the range of from about 1 to about 35 percent by weight of the coating composition. Although a single extender pigment is ordinarily used, mixtures of several extender pigments are satisfactory.

Opacifying or coloring pigments may also be included in the radiation curable coating composition in conventional amounts. Dyes and tints may similarly be included.

Another optional ingredient is resinous pigment dispersant or grinding vehicle. There are many resinous dispersants which are commercially available for that purpose. These resins are often low molecular weight resins which have a high carboxyl content. Illustrative of such pigment dispersants are the so-called acrysol dispersants such as Acrysol I-94, a copolymer of butyl acrylate, methyl methacrylate, styrene and acrylic acid, available commercially from the Rohm and Haas Company. These dispersants are used in the manner and in amounts known to the art.

Conventional plasticizers such as dibutyl phthalate, butyl benzyl phthalate, diisooctyl phthalate, decyl butyl phthalate, diisooctyl adipate, dibutyl sebacate, butyl benzoate triisooctyl trimellitate, n-octyl n-decyl trimellitate, and tricresyl phosphates and flow promoters such as phenyl benzoate, dibenzyl ketone, benzyl methyl ketone and the like may also be optionally included in amounts customary in the art.

Various conventional chain modifying agents or chain-transfer agents may be included in the mixture. The preferred chain-transfer agents are the mercaptan compounds such as dodecyl mercaptan, tertiary dodecyl mercaptan, octyl mercaptan, hexyl mercaptan and the like. The quantity and manner of use are also known in the art.

Any of the conventional viscosity control agents may be optionally employed in the composition. The preferred materials are resinous or polymeric viscosity control agents. Many of these resinous materials are available. Illustrative of such materials are cellulose acetate butyrate, sodium carboxymethyl cellulose and the like. The use of such resinous or polymeric viscosity control agents is advantageous in that it permits the mixture to be prepared in the form of a viscous mass or syrup having sufficient viscosity to remain in place on the substrate until polymerization is effected. These viscosity control agents are used in the manner and in amounts known to the art.

Another optional ingredient which may be included in the coating composition is an inert volatile organic solvent. Mixtures of several inert volatile organic solvents may be used when desired. Examples of suitable inert volatile organic solvents are acetone, methyl ethyl ketone, methyl isobutyl ketone, methyl alcohol, ethyl alcohol, propyl alcohol, isopropyl alcohol, butyl alcohol, sec-butyl alcohol, isobutyl alcohol, tert-butyl alcohol, amyl alcohol, hexyl alcohol, 2-ethylhexyl alcohol, cellosolve, ethyl cellosolve, cellosolve acetate, 2-ethylhexyl acetate, tetrahydrofuran, and aliphatic naphtha. When inert volatile organic solvent is used, it is usually present in the range of from about 1 to about 15 percent by weight of the vehicle.

Photoinitiators, photosensitizers or both photoinitiators and photosensitizers are often included in ultraviolet light curable coating compositions. These materials are well known to the art. The preferred photosensitizer is benzophenone and the preferred photoinitiators are isobutyl benzoin ether, mixtures of butyl isomers of butyl benzoin ether and $\alpha,\alpha$-diethyoxyacetophenone.

The photoinitiator, photosensitizer or mixture of these is usually present in the ultraviolet light curable coating composition in an amount in the range of from about 0.01 percent to about 50 percent by weight of the binder of the coating composition. An amount in the range of from about 0.05 percent to about 10 percent is more often used. An amount in the range of from about 0.1 percent to about 5 percent is preferred.

Although several of the optional materials commonly found in ultraviolet light curable coating compositions have been described, the list is by no means inclusive. Other materials may be included for purposes known to the art.

The radiation curable coating compositions are usually prepared by simple admixing of the various ingredients. Although mixing is usually accomplished at room temperature, elevated temperatures are sometimes used. The maximum temperature which is usable depends upon the heat stability of the ingredients. Temperatures above about 200° C. are only rarely employed.

The ultraviolet light curable coating composition of the invention is generally used to form cured adherent coatings on substrates. The substrate is coated with the coating composition using substantially any technique known to the art. These include spraying, curtain coating, dipping, roller application, printing, brushing, drawing and extrusion. The coated substrate is then exposed to ionizing radiation in the first stage, to ultraviolet light in the second stage and to ionizing radiation in the third stage, as hereinbefore described.

Substrates which may be coated with the radiation curable coating composition may vary widely in their properties. Organic substrates such as wood, fiberboard, particle board, composition board, paper, cardboard and various polymers such as polyesters, polyamides, cured phenolic resins, cured aminoplasts, acrylics, polyurethanes and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chromium, zinc and alloys.

Cured coatings of the radiation curable coating composition usually have thicknesses in the range of from about 0.001 millimeter to about 3 millimeters. More often they have thicknesses in the range of from about 0.007 millimeter to about 0.3 millimeter. When the radiation curable coating composition is a radiation curable printing ink, the cured coatings usually have thicknesses in the range of from about 0.001 millimeter to about 0.03 millimeter.

The ionizing radiation employed in the invention is radiation possessing an energy at least sufficient to produce ions either directly or indirectly in a medium composed of common elements such as air or water and includes ionizing particle radiation and ionizing electromagnetic radiation. Ionizing particle radiation designates the emission of electrons or accelerated nuclear particles such as protons, alpha particles, deuterons, beta particles, neutrons or their analogs. Charged particles can be accelerated using such devices as resonance chamber accelerators, DC potential gradient accelerators, betatrons, synchrotrons, cycototrons, etc. Neutron radiation can be produced by bombarding a selected light metal such as beryllium with positively charged particles of high energy. Ionizing particle radiation can also be obtained by the use of an atomic pile, radioactive isotopes or other natural or synthetic radioactive materials. Ionizing electromagnetic radiation comprises high energy photons. Examples are X-rays, bremsstrahlung and gamma rays.

X-rays may be produced when a metallic target such as tungsten, copper or molybdenum is bombarded with electrons of suitable energy. This energy is conferred to the electrons by accelerators, usually, but not necessarily, of the linear type. Travelling wave linear accelerators, standing wave linear accelerators and DC potential gradient linear accelerators are ordinarily employed for this purpose.

Bremsstrahlung, also known as continuous X-rays, is produced by the deceleration of electrons. The continuum extends from a short-wave limit dependent upon the maximum energy of the electrons indefinitely toward the long wavelength end of the spectrum.

Gamma rays may be obtained by means of a nuclear reactor, such as a pile, by the use of natural or synthetic radioactive materials such as cobalt 60 or radium which emit gamma rays, or by absorption of a neutron in the $(n,\gamma)$ reaction.

The ionizing radiation, whether particle radiation or electromagnetic radiation, ordinarily has an energy of at least about 10 electron volts. While there is no upper limit to the energy of ionizing radiation which can be used advantageously, the effects desired in the practice of this invention can be accomplished without resorting to the use of ionizing radiation having energies above about 20,000,000 electron volts.

Accelerated electrons is the preferred ionizing radiation for crosslinking coatings of the radiation curable coating composition of the invention. Bremsstrahlung generated by the deceleration of the electrons is also present and probably contributes to crosslinking. Various types of linear electron accelerators are known, for example, the ARCO type travelling wave accelerator, model Mark I, operating at 3 to 10 million electron volts supplied by High Voltage Engineering Corporation, Burlington, Mass., or other types of accelerators such as are described in U.S. Pat. No. 2,763,609 and British Patent Specification No. 762,953 are satisfactory for the practice of this invention. Usually the electrons are accelerated to energies in the range of from about 10,000 electron volts to about 1,000,000 electron volts. Typically, the energy is in the range of from about 20,000 electron volts to about 500,000 electron volts. Preferably, the energy is in the range of from about 25,000 electron volts to about 200,000 electron volts.

The unit of dose of ionizing radiation is the "rad" which is equal to 100 ergs of energy absorbed from ionizing radiation per gram of material being irradiated. Dose is initially determined using an absolute method such as calorimetry or ionization dosimetry. These absolute methods are quite sophisticated and hence are not generally practical for routine determinations. Once a radiation field has been explored by an absolute method of dosimetry, it is possible to calibrate secondary radiation indicators in that field using relative dosimetry techniques. One simple method of relative dosimetry is based upon the bleaching of blue cellophane by ionizing radiation. The blue cellophane is exposed to a standard source for a known time and the transmittance of light having a wavelength of 655 nanometers is measured with a spectrophotometer. The transmittance of unexposed cellophane is also measured and the percent change in transmittance due to exposure to ionizing radiation is calculated. From several such readings and calculations, a graph may be constructed relating change in transmittance with dose. A blue cellophane manufactured by the E. I. du Pont de Nemours & Company has been used for this purpose. The calibrated blue cellophane may then be used to calibrate other sources of the same kind of radiation and other kinds of blue cellophane which may be used in routine work. Avisco cellophane 195 CMS light blue manufactured by the American Viscose Division of FMC Corporation has been calibrated and used for routine dose determinations. In practice, the calibrated blue cellophane is exposed to the ionizing radiation before, after or simultaneously with the coated substrate being irradiated. The dose received by the coating is considered to be the same as that received by the blue cellophane. This presumes that the absorption of energy by the coating is the same as that of the blue cellophane. Except for materials containing rather large proportions of atoms of very high atomic weight, the absorption of ionizing radiation is nearly independent of the identity of the material. The presumption is therefore valid for the ordinary work of coatings manufacturing where very high degrees of accuracy of dose measurement are not needed. As used throughout the specification and claims, dose is referenced to the bleaching of calibrated blue cellophane film irrespective of the identity of the coating composition being irradiated.

In each of the first and third stages, coatings of the radiation curable coating composition ordinarily receive a dose of ionizing radiation in the range of from about 0.01 megarad to about 20 megarads, although doses greater than 20 megarads may be used satisfactorily. The dose, however, should not be so great that the chemical or physical properties of the coating are seriously impaired. Typically, the dose in each of the first and third stages is in the range of from about 0.1 megarad to about 20 megarads. The preferred dose is in the range of from about 1 megarad to about 10 megarads. After exposure to ionizing radiation in the third stage, the coating is substantially fully cured throughout its thickness.

Any suitable source which emits ultraviolet light, viz., electromagnetic radiation having a wavelength in the range of from about 180 to about 400 nanometers, may be used in the practice of this invention. Because such ultraviolet light possesses insufficient energy to produce ions in a medium composed of common elements such as air or water, it is considered to be nonionizing radiation. Suitable sources of ultraviolet light are mercury arcs, carbon arcs, low pressure mercury lamps, medium pressure mercury lamps, high pressure mercury lamps, swirlflow plasma arc and ultraviolet light emitting diodes. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at both ends. Examples of these lamps are PPG Models 60-2032, 60-0393, 60-0197 and 60-2031 and Hanovia Models 6512A431, 6542A431, 6565A431 and 6577A431.

The time of exposure to ultraviolet light and the intensity of ultraviolet light to which the coating composition is exposed in the second stage, may vary greatly. In keeping with the general principles heretofore set forth, the exposure to ultraviolet light in the second stage should be such that the exterior portion of the surface layer is cured to a greater degree than the interior portion of the surface layer. It is preferred that the exposure to ultraviolet light should continue until the C-stage is reached when a hard, substantially fully-cured surface results. In certain applications, however, it may be desirable for the curing to continue only until the B-stage, viz., gel stage, has been obtained in the exterior portion of the surface layer. In either case, the interior portion of the surface layer is cured to a lesser degree than the exterior portion during exposure in the second stage.

In the illustrative example which follows, all parts are parts by weight and all percentages are percentages by weight unless otherwise specified.

EXAMPLE

A reactor equipped with a heater, a cooler, an agitator, a distillation column, condenser, phase separator, a source of air and a source of nitrogen is charged with 1150 parts 2,2-dimethylpropane-1,3-diol (viz., neopentyl glycol), 1830 parts acrylic acid and 66.5 parts hydroquinone. The condenser and phase separator are set for azeotropic distillation and heat is applied to melt the charge. Three hundred twenty-five parts cyclohexane and 165 parts p-toluene sulfonic acid are added to the melt. The reaction mixture is then heated to 79° C. when reflux is observed and the removal of water is begun. Three hours and ten minutes later when 403 parts water have been removed and the temperature has arisen to 102° C., 55 parts cyclohexane is added. After a period of 55 minutes, the temperature has dropped to 99° C. Over the next 1½ hours, the temperature rises to 103° C. At this point, a total of 479 parts water has been removed. The source of heat is thereupon removed, cooling is applied and the removal of water is halted. When the temperature has dropped to 27° C., filtration of the reaction mixture through a filter bag into a condenser is begun. Twenty-five minutes later (temperature: 23° C.), the filtration is completed and the addition of 1445 parts cyclohexane is begun. Thirty minutes later (temperature: 18° C.), the addition is completed. Approximately half of the filtered reaction mixture is charged back into the reactor and washed with 455 parts of 20 percent aqueous sodium hydroxide solution. After withdrawing the aqueous layer, the organic layer is discharged into containers. The remaining half of the filtered reaction mixture is charged to the reactor. Thereafter, 1500 parts cyclohexane and 455 parts 20 percent aqueous sodium hydroxide solution are added and the mixture well agitated. After settling, the aqueous layer is removed. The organic layer is discharged into containers and the reactor is flushed with cyclohexane which is removed. The washed product is then transferred from containers to the reactor in two increments. Additions totaling 5.6 parts p-methoxyphenol are made. After mixing well, the material is discharged into containers. The material is next passed through a continuous vacuum flash-stripper operating at an absolute pressure of about 17 kilopascals (1 pascal=1 newton per square meter) and a temperature of about 127° C. where 1429 parts stripped product and 3134 parts condensed vapor (essentially cyclohexane) are recovered. The stripped product is found to have an acid number of 0.9, a Gardner-Holdt viscosity of A−; a Gardner color of 1–2 and to contain 0.06 percent water. Next, 1350 parts of the stripped product is subjected to further stripping in a batch vacuum distillation apparatus until the temperature of the remaining liquid (1250 parts) is 54.4° C. at an absolute pressure of 3.2 kilopascals. The liquid is cooled to about 27° C., the vacuum is broken with nitrogen and the product is discharged into containers. The product is a 1,3-bis(acrylyloxy)-2,2-dimethylpropane (viz., diacrylate of neopentyl glycol) composition having a solids content of 99+ percent, a Gardner-Holdt viscosity of A−, an acid number of less than one and a Gardner color of less than one.

The preparation of 3-acrylyloxy-2,2-dimethylpropyl 3-acrylyloxy-2,2-dimethylpropionate is described in Example 1 of U.S. Pat. No. 3,645,984.

A vessel equipped with an agitator is charged with 714.66 parts 3-acrylyloxy-2,2-dimethylpropyl 3-acrylyloxy-2,2-dimethyl-propionate (viz., APAP) and 89.33 parts ½ second cellulose acetate butyrate (viz., CAB) is added slowly with high agitation of the mixture. Agitation is continued until the cellulose acetate butyrate is thoroughly dissolved. An additional 89.33 parts ½ second cellulose acetate butyrate is added under higher agitation. Agitation is continued until the added cellulose acetate butyrate is thoroughly dissolved to produce a CAB-APAP solution.

A white paste is prepared by admixing 102.32 parts of the above CAB-APAP solution, 511.88 parts 3-acrylyloxy-2,2-dimethyl-propyl 3-acrylyloxy-2,2-dimethylpropionate and 1028.66 parts rutile pigment and grinding the resulting mixture to disperse the rutile pigment.

A container is charged with 199.73 parts of the above 1,3-bis(acrylyloxy)-2,2-dimethylpropane composition, 100.00 parts 3-acrylyloxy-2,2-dimethylpropyl 3-acrylyloxy-2,2-dimethylpropionate and 8.00 parts triphenylphosphine. The materials are mixed until dissolved. To the mixture are added 297.00 parts of the above CAB-APAP solution and 507.90 parts of the above white paste and the contents of the container are admixed to produce a tint base.

A blue pigment dispersion is prepared by admixing 525.87 parts of the CAB-APAP solution, 262.94 parts 3-acrylyloxy-2, 2-dimethylpropyl-3-acrylyloxy-2,2-dimethylpropionate and 140.24 parts blue phthalocyanine pigment (Monastral Blue; E. I. du Pont de Nemours & Co.) and grinding the mixture to disperse the pigment.

A black pigment dispersion is prepared by admixing 553.02 parts of the CAB-APAP solution, 276.91 parts 3-acrylyloxy-2,2-dimethylpropyl-3-acrylyloxy-2,2-dimethylpropionate and 92.22 parts lampblack and grinding the mixture to disperse the pigment.

A yellow pigment dispersion is prepared by admixing 530.37 parts of the CAB-APAP solution, 265.18 parts 3-acrylyloxy-2,2-dimethylpropyl-3-acrylyloxy-2,2-dimethylpropionate and 340.95 parts yellow iron oxide pigment and grinding the mixture to disperse the pigment.

A green pigment dispersion is prepared by admixing 541.86 parts of the CAB-APAP solution, 270.93 parts 3-acrylyloxy-2,2-dimethylpropyl-3-acrylyloxy-2,2-dimethylpropionate and 143.43 parts phthalocyanine green pigment and grinding the mixture to disperse the pigment.

A dawn blue coating composition is prepared by admixing 1066.67 parts of the above tint base, 17.90 parts of the above blue pigment dispersion, 12.81 of the above black pigment dispersion, 6.17 parts of the above yellow pigment dispersion and 3.14 parts of the above green pigment dispersion.

In the electron beam and ultraviolet light exposures hereinafter described, the surrounding atmospheres are either air or mixtures of air and nitrogen.

Five primed hardboard panels are coated with the dawn blue coating composition. The five coated panels are exposed in the first stage to an electron beam and each receives a dose of 5 megarads. The oxygen concentration of the atmosphere surrounding each panel during exposure is shown in the Table. The five coated panels are then passed once, at a speed of 24.4 meters per minute, in a nitrogen atmosphere containing less than 500 parts oxygen per million parts atmosphere by volume, under eight medium pressure mercury vapor lamps which are emitting ultraviolet light in the second stage. Next, four of the coated panels are exposed in the third stage to an electron beam and each receives a dose of 5 megarads. The oxygen concentration of the atmospheres surrounding each panel during exposure is shown in the Table. The 60° gloss and the 85° gloss are measured for each panel; the results are shown in the Table.

Table

| Panel Number | Oxygen Concentration in Atmosphere, percent by volume | | | Gloss | | Coating |
|---|---|---|---|---|---|---|
| | First Stage | Second Stage | Third Stage | 60° | 85° | Cross section |
| 1 | 21 | <0.05 | 21 | 3 | 4 | Hard Throughout |
| 2 | 13 | <0.05 | 13 | 4 | 4 | Hard Throughout |
| 3 | 9 | <0.05 | 9 | 2 | 3 | Hard Throughout |
| 4 | 5 | <0.05 | 5 | 4 | 19 | Hard Throughout |
| 5 | 21 | <0.05 | No Exposure | 3 | 3 | Soft Interior Portion |

The third panel is evaluated for stain resistance using seven of the more severe stains. In this test, the cured surface of the third panel is cleaned with alcohol and dried. The stains are applied to separate portions of the panel and each treated portion is covered with a watch glass to prevent evaporation. After standing 16 hours at room temperature, the watch glasses are removed and the panel is washed with water and then a solvent mixture of two parts ethyl alcohol to one part VM&P Naphtha. One hour after cleaning, the panel is examined for staining by placing it in a horizontal position at normal table height (approximately 76 centimeters) under overhead white fluorescent light and viewing it at an angle of approximately 90 degrees to the surface. During the viewing, outside direct light such as sunshine is avoided as such light may accentuate or minimize the stain. Upon viewing, each treated portion of the panel is assigned a Stain Rating on a scale of from 0 to 3, where 0=no effect, 1=light stain or slight appearance change, 2=definite or heavy stain, 3=maximum stain or film deterioration. The identity of the stains and the accompanying Stain Rating is shown in Table 2.

Table 2

| Stain Resistance of Panel Number Three | |
|---|---|
| Stain | Stain Rating |
| Alcohol Containing | |
| 1% Iodine | 2 |
| Dyan Shine Shoe Polish | 0 |
| Tincture of Merthiolate | 0 |
| Rit Dye | 0 |
| Mustard Paste | 0 |
| Amyl Acetate | 0 |
| Ammonia Water | 0 |

We claim:

1. A method of producing a hard, mar resistant and abrasion resistant, cured coating of low gloss comprising:
   a. exposing a coating of radiation curable coating composition comprising:
      (1) an oxygen inhibitable, radiation curable organic material having a plurality of sites of ethylenic unsaturation, and
      (2) an ultraviolet light absorbing pigment
   to ionizing radiation in an atmosphere containing a low gloss imparting amount of oxygen to cure the interior of said coating to a greater degree of cure than a surface layer of said coating;
   b. exposing said coating which has been exposed to ionizing radiation to ultraviolet light in an atmosphere wherein any oxygen present is insufficient to significantly inhibit free radical curing of the exterior portion of said surface layer to cure said exterior portion of said surface layer to a greater degree of cure than the interior portion of said surface layer;
   exposing said coating which has been exposed to ionizing radiation and ultraviolet light to ionizing radiation to cure said interior portion of said surface layer.

2. The method of claim 1 wherein said ultraviolet light absorbing pigment is titanium dioxide.

3. The method of claim 2 wherein said titanium dioxide is rutile.

4. The method of claim 1 wherein said organic material is an oxygen inhibitable, radiation curable, organic polymer having a plurality of sites of ethylenic unsaturation.

5. The method of claim 4 wherein the number average molecular weight of said organic polymer is in the range of from about 1500 to about 50,000.

6. The method of claim 4 wherein said organic polymer is an ethylenically unsaturated polyester.

7. The method of claim 1 wherein said organic material is an oxygen inhibitable, radiation curable, organic monomer having a plurality of sites of ethylenic unsaturation and a molecular weight of at least 170.

8. The method of claim 7 wherein said organic monomer comprises divalent, trivalent, tetravalent or moderately higher polyvalent organic radical whose bonds are satisfied with unsubstituted acrylyloxy, α-substituted acrylyloxy or other ethylenically unsaturated groups.

9. The method of claim 7 wherein said organic monomer comprises 3-acrylyloxy-2,2-dimethylpropyl 3-acrylyloxy-2,2-dimethylpropionate.

10. The method of claim 7 wherein said organic monomer comprises 1,3-bis(acrylyloxy)-2,2-dimethylpropane.

11. The method of claim 7 wherein said organic monomer comprises a mixture of 3-acrylyloxy-2,2-dimethylpropyl 3-acrylyloxy-2,2-dimethylpropionate and 1,3-bis(acrylyloxy)-2,2-dimethylpropane.

12. The method of claim 7 wherein said organic monomer comprises an urea containing acrylic monomer.

13. The method of claim 7 wherein said organic monomer comprises epoxidized drying oil acrylates.

14. The method of claim 7 wherein said organic monomer comprises epoxidized semi-drying oil acrylates.

15. The method of claim 7 wherein said organic monomer comprises melamine-based acrylates.

16. The method of claim 7 wherein the molecular weight of said organic monomer is in the range of from about 170 to about 1500.

17. The method of claim 1 wherein said atmosphere containing a low gloss imparting amount of oxygen has an oxygen concentration in the range of from about $1.0 \times 10^4$ to about $2.2 \times 10^5$ parts of oxygen per million parts of said atmosphere by volume.

18. The method of claim 1 wherein said atmosphere containing a low gloss imparting amount of oxygen is air.

19. The method of claim 1 wherein said atmosphere wherein any oxygen present is insufficient to significantly inhibit free radical curing of the exterior portion of the surface layer has an oxygen concentration in the range of from about 300 to about 5000 parts oxygen per million parts of said atmosphere by volume.

20. The method of claim 1 wherein said coating which has been exposed to ionizing radiation and ultraviolet light is exposed to ionizing radiation in an atmosphere of air.

21. The method of claim 1 wherein:
   a. the first exposure to ionizing radiation is conducted in air;
   b. the exposure to ultraviolet light is conducted in an atmosphere having an oxygen concentration of less than about 1000 parts oxygen per million parts of atmosphere, by volume; and
   c. the second exposure to ionizing radiation is conducted in air.

22. The method of claim 1 wherein said coating receives a dose in the range of from about 0.01 megarad to about 20 megarads during each exposure to ionizing radiation.

23. The method of claim 1 wherein said ionizing radiation is accelerated electrons.

24. The method of claim 1 wherein:
   a. said organic material is an oxygen inhibitable, radiation curable, organic monomer having a plurality of sites of ethylenic unsaturation and a molecular weight in the range of from about 170 to about 1500;
   b. said ultraviolet light absorbing pigment is titanium dioxide;
   c. said atmosphere containing a low gloss imparting amount of oxygen has an oxygen concentration of about $2.1 \times 10^5$ parts oxygen per million parts atmosphere, by volume;

d. said atmosphere wherein any oxygen present is insufficient to significantly inhibit free radical curing of the exterior portion of the surface layer has an oxygen concentration less than 1000 parts oxygen per million parts atmosphere by volume;

e. said coating which has been exposed to ionizing radiation and ultraviolet light is exposed to ionizing radiation in am atmosphere having an oxygen concentration of about 2.1 parts oxygen per million parts atmosphere, by volume; and f. said coating receives a dose in the range of from about 0.1 megarad to about 20 megarads during each exposure to ionizing radiation.

25. The method of claim 24 wherein said ionizing radiation is accelerated electrons.

26. The method of claim 24 wherein said oxygen inhibitable, radiation curable, organic monomer comprises 3-acrylyloxy-2,2-dimethylpropyl 3-acrylyloxy-2,2-dimethylpropionate.

* * * * *

UNITED STATES PATENT AND TRADEMARK OFFICE
CERTIFICATE OF CORRECTION

PATENT NO. : 4,170,663

DATED : October 9, 1979

INVENTOR(S) : Ernest A. Hahn, Gary F. Murphy, deceased and Gerald J. Bruckbauer

It is certified that error appears in the above-identified patent and that said Letters Patent are hereby corrected as shown below:

Column 17, line 31, delete "an".

Column 17, line 44, insert --c.-- before "exposing".

Column 17, line 54, delete "an".

Column 17, line 61, delete "an".

Column 17, line 63, delete "an".

Column 18, line 14, delete "an".

Column 18, line 58, delete "an".

Column 19, line 8, "am" should be --an--.

Signed and Sealed this

Twenty-sixth Day of February 1980

[SEAL]

Attest:

Attesting Officer

SIDNEY A. DIAMOND

Commissioner of Patents and Trademarks